(12) United States Patent
Frisken et al.

(10) Patent No.: US 8,867,917 B2
(45) Date of Patent: Oct. 21, 2014

(54) OPTICAL WAVELENGTH SELECTIVE SWITCH CALIBRATION SYSTEM

(75) Inventors: Steven James Frisken, Vaucluse (AU); Glenn Wayne Baxter, Hornsby Heights (AU); Cibby Pulikkaseril, Waterloo (AU); Novelene Wang, Georges Hall (AU)

(73) Assignee: Finisar Corporation, Horsham, PA (US)

( * ) Notice: Subject to any disclaimer, the term of this patent is extended or adjusted under 35 U.S.C. 154(b) by 74 days.

(21) Appl. No.: 13/532,735

(22) Filed: Jun. 25, 2012

(65) Prior Publication Data

US 2012/0328291 A1 Dec. 27, 2012

Related U.S. Application Data

(60) Provisional application No. 61/501,598, filed on Jun. 27, 2011.

(51) Int. Cl.
| | |
|---|---|
| H04B 17/00 | (2006.01) |
| H04J 14/02 | (2006.01) |
| G02B 6/35 | (2006.01) |
| H04Q 11/00 | (2006.01) |

(52) U.S. Cl.
CPC ............ *H04Q 11/0005* (2013.01); *G02B 6/356* (2013.01); *G02B 6/3588* (2013.01); *H04Q 2011/0039* (2013.01)
USPC .................. 398/82; 398/25; 398/86; 398/87; 398/88; 398/96

(58) Field of Classification Search
CPC .............. H04Q 2011/0024; H04Q 2011/0026; H04Q 2011/003; H04Q 2011/0039; H04Q 2011/0049
USPC ............ 398/45, 48, 55, 56, 82, 86–88, 96, 25
See application file for complete search history.

(56) References Cited

U.S. PATENT DOCUMENTS

| | | |
|---|---|---|
| 6,327,019 B1 | 12/2001 | Patel et al. |
| 7,092,599 B2 | 8/2006 | Frisken |

(Continued)

FOREIGN PATENT DOCUMENTS

| | | |
|---|---|---|
| WO | 02/075410 A1 | 9/2002 |
| WO | 03/032071 A1 | 4/2003 |
| WO | 2004/005993 A1 | 1/2004 |

OTHER PUBLICATIONS

Pulikkaseril, et al., Spectral Modeling Of Channel Band Shapes in Wavelength Selective Switches, Optics Express, Apr. 25, 2011, pp. 8458-8470, vol. 19, No. 9, Optical Society of America, US.

(Continued)

*Primary Examiner* — Dalzid Singh
(74) *Attorney, Agent, or Firm* — Kurt Rauschenbach; Rauschenbach Patent Law Group, LLC

(57) ABSTRACT

Described herein are systems and methods of enhancing channel bandwidth in an optical system having a number of wavelength selective switching (WSS) devices. The method includes the steps of passing the optical signals through the WSS devices by: (i) spatially dispersing the wavelength channels of the optical signals; (ii) projecting the spatially dispersed channels onto corresponding predetermined regions of an optical manipulation matrix including a plurality of individually addressable manipulating elements; (iii) determining a modification function that specifies a state for each manipulating element within the predetermined region; and (iv) driving the elements of the corresponding regions at states specified by the function to selectively modify the channel band shape such that the received channel's bandwidth is substantially enhanced, and to spatially direct the wavelength channels to predetermined output ports of the WSS devices.

13 Claims, 16 Drawing Sheets

(56) References Cited

U.S. PATENT DOCUMENTS

| | | | |
|---|---|---|---|
| 7,277,608 B2 * | 10/2007 | Isomura et al. | 385/24 |
| 7,426,347 B2 * | 9/2008 | Hnatiw et al. | 398/38 |
| 7,440,648 B2 * | 10/2008 | Oikawa et al. | 385/16 |
| 7,457,547 B2 | 11/2008 | Frisken et al. | |
| 2002/0131691 A1 | 9/2002 | Garrett et al. | |
| 2012/0236216 A1 * | 9/2012 | Sharma et al. | 349/1 |

OTHER PUBLICATIONS

"Supplementary Search Report" for EP 05749258.9-2217/1766819, Jan. 21, 2013, European Patent Office, Munich, Germany.

* cited by examiner

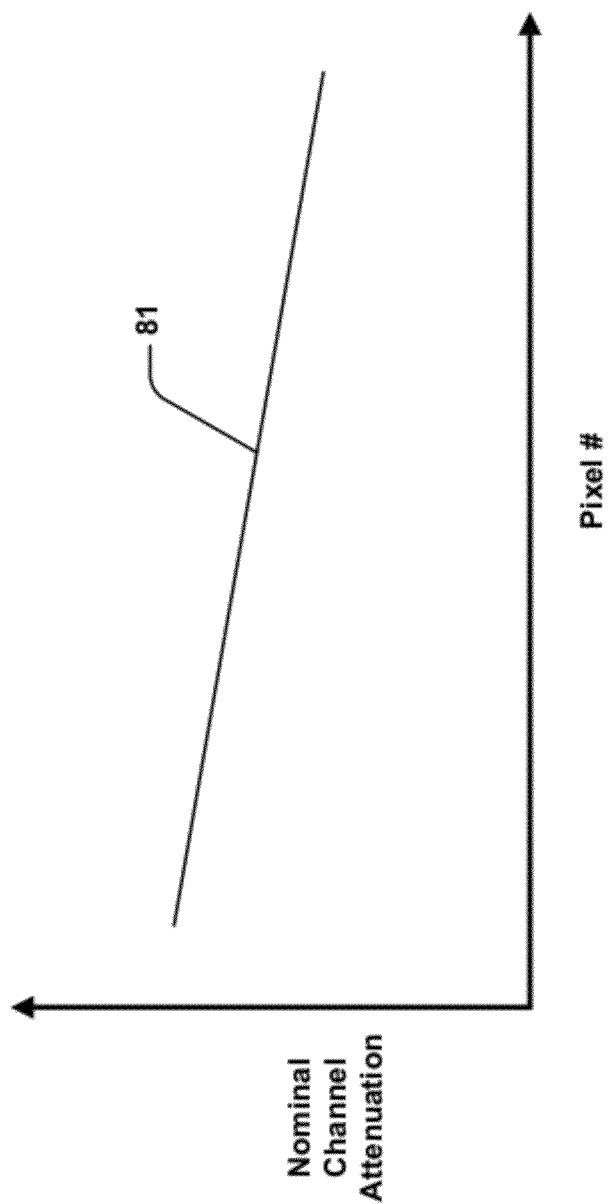

OPTICAL WAVELENGTH SELECTIVE SWITCH CALIBRATION SYSTEM

CROSS-REFERENCE TO RELATED APPLICATIONS

The present application is a non-provisional of copending U.S. Provisional Patent Application Ser. No. 61/501,598, filed on Jun. 27, 2011. The entire contents of U.S. Patent Application Ser. No. 61/501,598 is herein incorporated by reference.

FIELD OF THE DISCLOSURE

The present disclosure relates to optical communication systems and in particular to a system and method for dynamically reshaping optical signals in wavelength switching devices. While some embodiments will be described herein with particular reference to that application, it will be appreciated that the disclosure is not limited to such a field of use, and is applicable in broader contexts.

BACKGROUND

Any discussion of the background art throughout the specification should in no way be considered as an admission that such art is widely known or forms part of common general knowledge in the field.

Optical networks use Wavelength Selective Switches (WSS) to dynamically route optical wavelength signals from a source to a destination. WSS devices often rely on wavelength manipulation elements such as liquid crystal on silicon (LCOS) devices or micro-electromechanical (MEMS) mirror arrays to perform the routing.

LCOS devices, such as those utilized in U.S. Pat. No. 7,092,599 (Frisken), include a liquid crystal material sandwiched between a transparent glass layer having a transparent electrode, and a silicon substrate divided into a two-dimensional array of individually addressable pixels. Each pixel is individually drivable by a voltage signal to provide a local phase change to an optical signal, thereby providing a two-dimensional array of phase manipulating regions. Similarly, MEMS based WSS devices, such as those utilized in PCT Application Publication WO 02/075410 (Wilde et al.), include a 2-dimensional array of individually tiltable mirrors. Each mirror operates on the local optical wavefront to selectively steer and manipulate optical signals incident thereon.

Manipulation of individual spectral components is possible once an optical signal has been spatially separated by a diffractive element such as a diffraction grating. The spatial separation of spectral components is directed onto predetermined regions of the LCOS device or MEMS array, which can be independently manipulated by driving the corresponding pixels/mirrors in a predetermined manner.

It is known to use LCOS devices for applications such as optical component emulation, (dynamic) gain shaping, channel add/drop or channel routing, and FLEXGRID™: dynamic channel control and group delay/dispersion adjustment. For example, U.S. Pat. No. 7,457,547 (Frisken et al.) entitled "Optical calibration system and method", which is incorporated herein by way of cross-reference, discloses a system and method for calibrating an LCOS device to compensate for phase distortions and to reduce cross-talk. LCOS devices can be used to modify or selectively attenuate the channel spectrum by driving selected pixels with a sinusoidal signal or by varying the local angle θ of the phase steering function.

One issue that is encountered in optical systems is the alteration or degradation of the spectral shape of wavelength channels transmitted through the system. In traversing each optical component, such as a WSS, the spectral shape of a wavelength channel is modified, depending upon the filter function of that device. This is particularly prominent in systems implementing twin reconfigurable add/drop multiplexer (ROADM) architectures wherein each ROADM includes a first WSS for dropping channels and a second WSS for adding channels. When compared to traditional broadcast and select architectures, these twin architectures provide improved channel blocking and isolation. However, they suffer from effects arising from an additional WSS being present.

One particular detrimental effect is the narrowing of a channel bandwidth upon transmission through a WSS, as reported in Pulikkaseril et al., "Spectral Modeling of Channel Band Shapes in Wavelength Selective Switches", Optics Express, Vol. 19, No. 9, 25 Apr. 2011. Cascading WSS devices has the net effect of multiplying the filter spectra together. Therefore, this narrowing effect is amplified when a particular wavelength channel is transmitted through a series of concatenated WSS devices, as is encountered in many optical networks.

In optical component emulation, the bandwidth of an isolated wavelength channel can be controlled for testing purposes by adjusting the number of LCOS pixel columns which are directed towards an outgoing port. However, in WSS devices, the channel plan can be fully loaded and the channels closely packed together across the LCOS pixel matrix. Slight additional pixel space can be provided by sharing pixel columns between two adjacent channels. Further, dividing columns between two channels can aide in centering the channel on the International Telecommunications Union (ITU) grid. This sharing is possible by setting the pixels of that column such that a first sub-column of pixels couples a first channel but attenuates the second, while a second sub-column couples the second channel but attenuates the first. However, even implementing this "partial columns" technique, the channel bandwidth cannot be extended beyond the edge of the adjacent channels.

Therefore, there is a desire to more adequately compensate for this bandwidth narrowing effect in WSS devices.

SUMMARY OF THE DISCLOSURE

It is an object of the presently disclosed systems and methods, in their preferred form, to provide improvements in the reduction of channel bandwidth narrowing in optical systems of concatenated optical switches.

In accordance with a first aspect, there is provided a method of enhancing the network bandwidth transmission of a wavelength selective switch of the type having a controllable wavelength dependant attenuation modification of wavelength channels, the method including the step of:

(a) receiving one or more wavelength channels having a bandwidth distributed spatially along a wavelength axis;

(b) modifying the optical attenuation characteristics of the one or more wavelength channels relative to the wavelength axis to provide for enhanced bandwidth transmission.

The modifying step preferably includes applying a relative attenuation offset between at least one side spectral region and a central spectral region of a wavelength channel. The amount of attenuation along the wavelength axis at any particular wavelength channel is preferably maintained to within a predetermined permitted attenuation specification for the wavelength selective switch.

The amount of attenuation at any wavelength is preferably non-linear with respect to the overall attenuation of the wavelength selective switch at any wavelength. Preferably, the amount of attenuation with respect to wavelength is further modelled in a non linear manner, including:

for low levels of actual wavelength attenuation relative to a permitted amount of attenuation, a monotonic increasing level of attenuation up to a predetermined limit;

for high levels of actual wavelength attenuation relative to a permitted amount of attenuation, a monotonically decreasing level of attenuation.

Further, for levels of attenuation exceeding said permitted amount of attenuation, the end regions of a channel are preferably attenuated more than a central region of a channel.

The method of the first aspect preferably further comprises modifying the degree of attenuation to take into account of other gain and/or non-linear equalizations.

According to second aspect, there is provided a method of enhancing channel bandwidth in an optical system, said method including the steps of:

a) transmitting at least one optical signal including at least one individual wavelength channel;

b) passing said at least one optical signal through at least one wavelength switching device by:
  (i) spatially dispersing said individual wavelength channels of said at least one optical signal;
  (ii) projecting said spatially dispersed wavelength channels onto corresponding predetermined regions of an optical manipulation matrix including a plurality of individually addressable manipulating elements;
  (iii) determining a modification function that specifies a state for each said manipulating element within said predetermined region; and
  (iv) driving said elements of said corresponding regions at states specified by said function to selectively modify said channel band shape such that the received channel's bandwidth is substantially enhanced, and to spatially direct said wavelength channels to predetermined output ports of said wavelength switching device; and c) receiving said wavelength channels.

The step of determining the modification function preferably includes determining a non-uniform attenuation profile to selectively attenuate the wavelength channel as a function of wavelength.

The attenuation profile preferably includes a relative attenuation offset between at least one edge spectral region and a central spectral region of the wavelength channel. The relative attenuation offset is preferably specified relative to a predetermined attenuation value corresponding to the wavelength switching device. More preferably:

for a first range of predetermined attenuation values, the relative attenuation offset is set equal to the predetermined attenuation value;

for a second range of predetermined attenuation values, the relative attenuation offset is set to a constant capped value; and for a third range of predetermined attenuation values, the relative attenuation offset is set to decrease linearly with an increase in the predetermined attenuation value.

The modification function preferably reduces the bandwidth of an optical transfer function characteristic of the wavelength switching device.

The ratio of the −0.5 dB to −20 dB bandwidth of the received wavelength channel is preferably enhanced.

BRIEF DESCRIPTION OF THE DRAWINGS

Preferred embodiments of the disclosure will now be described, by way of example only, with reference to the accompanying drawings in which:

FIG. 19 is a fourth plot of nominal channel attenuation as a function of pixel number across a wavelength channel on an LCOS device, showing a ramp attenuation function applied to the wavelength channel.

DETAILED DESCRIPTION

Described herein are methods and systems for enhancing data capacity channel bandwidth in an optical communication system. Embodiments of the present disclosure have been developed particularly for optical systems including a large number (~10 to 20) of optical switching devices. However, it will be appreciated that the systems and methods described herein can be extended to a wide variety of optical systems and networks.

Figure 1:
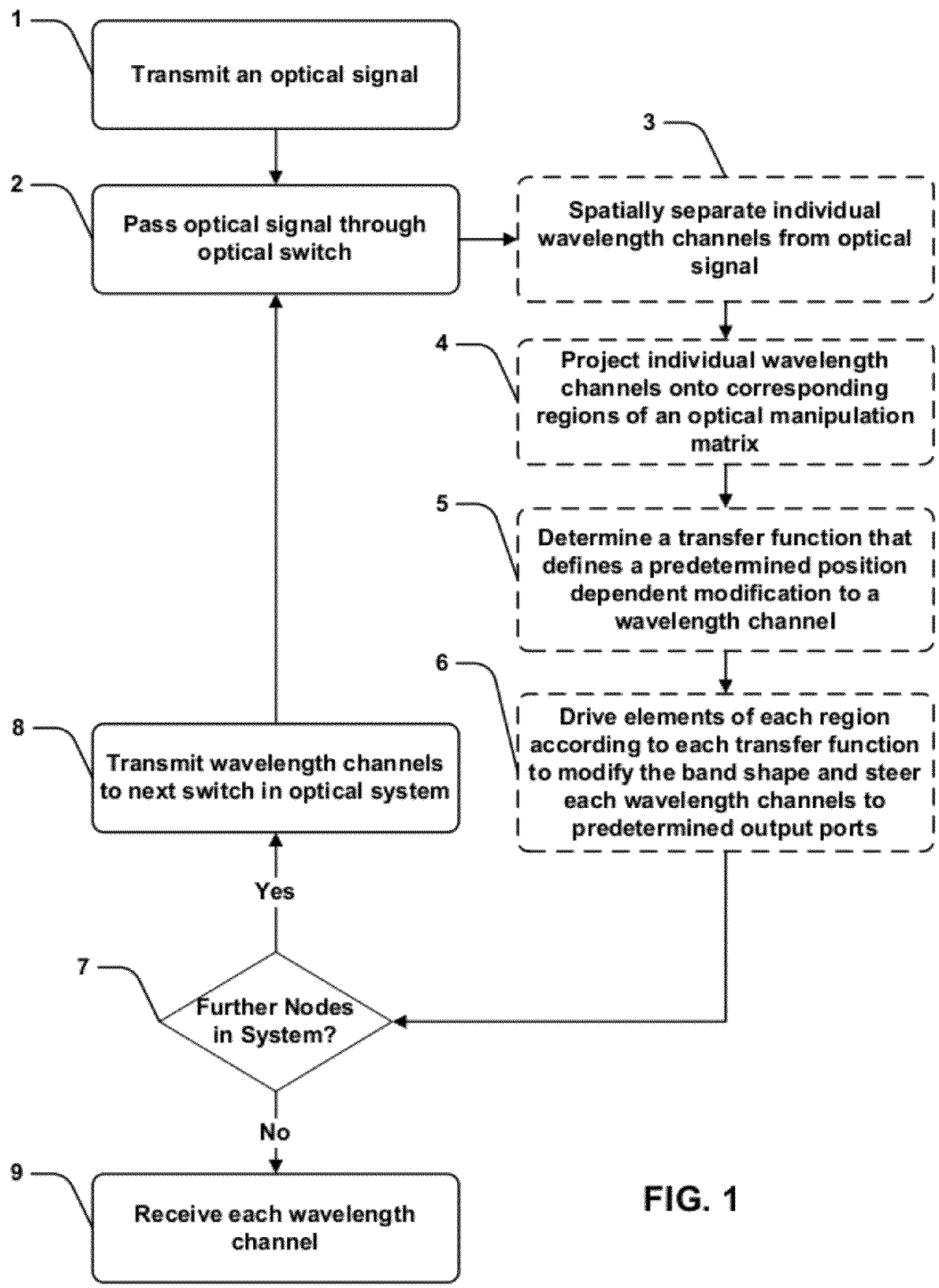
FIG. 1 is a flow chart illustrating the steps of the process according to one embodiment of the present disclosure.

Referring initially to FIG. 1 there is illustrated a flow chart outlining the steps of a method according to a first embodiment of the present disclosure. At step 1, at least one optical signal is transmitted through an optical system having a number of wavelength switching devices such as wavelength selective switches (WSS). The transmitted signals are multiplexed signals including a plurality of individual wavelength channels. By way of example, the signals may be dense wavelength division multiplexed optical signals having a number of channels spaced apart in frequency by 50 GHz. At step 2, the optical signals are passed through one or more WSS devices. In passing through each WSS, a number of sub-steps are performed (designated by dashed lines in FIG. 1). At sub-step 3, the individual wavelength channels are spatially separated from the optical signals. At sub-step 4, the spatially separated wavelength channels are projected onto corresponding predetermined regions of an optical manipulation matrix, which includes a plurality of individually addressable manipulating elements.

Each element is independently drivable within a prescribed range of voltage levels. At sub-step 5, a modification function is determined that specifies a state for elements within each predetermined region. At sub-step 6, the pixels of each corresponding region are driven at voltage levels specified by the modification function to selectively modify each channel band shape and to spatially direct each wavelength channel to predetermined output ports of the WSS. Specifically, the modification function selectively modifies a channel band shape such that the channel's bandwidth is substantially enhanced at a receiver, independent of the number of WSS devices that are passed. At step 7, if more WSS devices are included in the optical system, sub-steps 2 to 6 are repeated for each WSS (step 8). Finally, at step 9, the routed wavelength channels are received by a receiver at a specified location in the optical system.

The present disclosure will be described with particular reference to a liquid crystal on silicon (LCOS) device as the optical manipulation matrix having electrically drivable pixels or cells as the manipulating elements. However, it will be appreciated that the same principles can be applied to other optical manipulation matrix based devices such as microelectromechanical mirror (MEMS) devices and piezoelectric transducer arrays.

Figure 2:
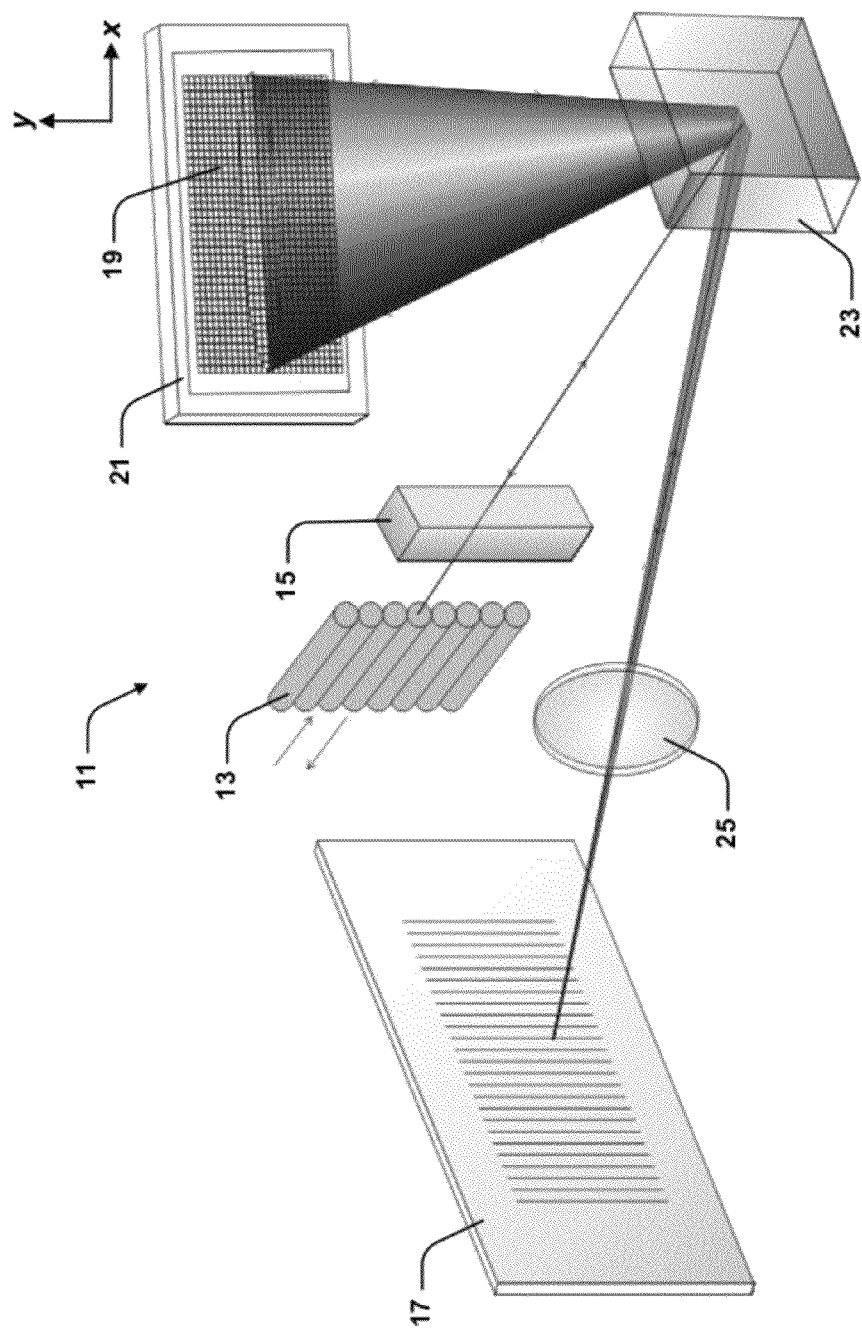
FIG. 2 is a schematic perspective view of a wavelength selective switch according to one embodiment.

Referring now to FIG. 2, there is illustrated schematically an example embodiment WSS device 11. Device 11 includes a plurality of input/output optical fibers 13 for transmitting and receiving optical signals. The signals are projected through polarization diversity optics 15 to control the polarization of the signals and minimize polarization dependent effects. The signals are then incident on a diffraction grating 17, which spatially separates the constituent wavelength channels of the optical signals. The spatially separated wavelength channels are then focused onto a 2D array of pixels 19 of an LCOS device 21, where each pixel is individually electronically addressed and causes a local phase retardation at a range of levels from 0 to $2\pi$ or more.

As will be discussed in detail below, the individually addressable nature of the LCOS pixels 19 allows a dynamic phase profile to be created, which selectively steers each wavelength channel to a desired output fiber and is also able to modify the spectral shape of the channels to perform various optical manipulation effects. The device 11 also includes an imaging mirror 23 and other imaging optics 25 for manipulating the optical signals for appropriate incidence onto the diffraction grating 17 and LCOS device 21.

Figure 3:
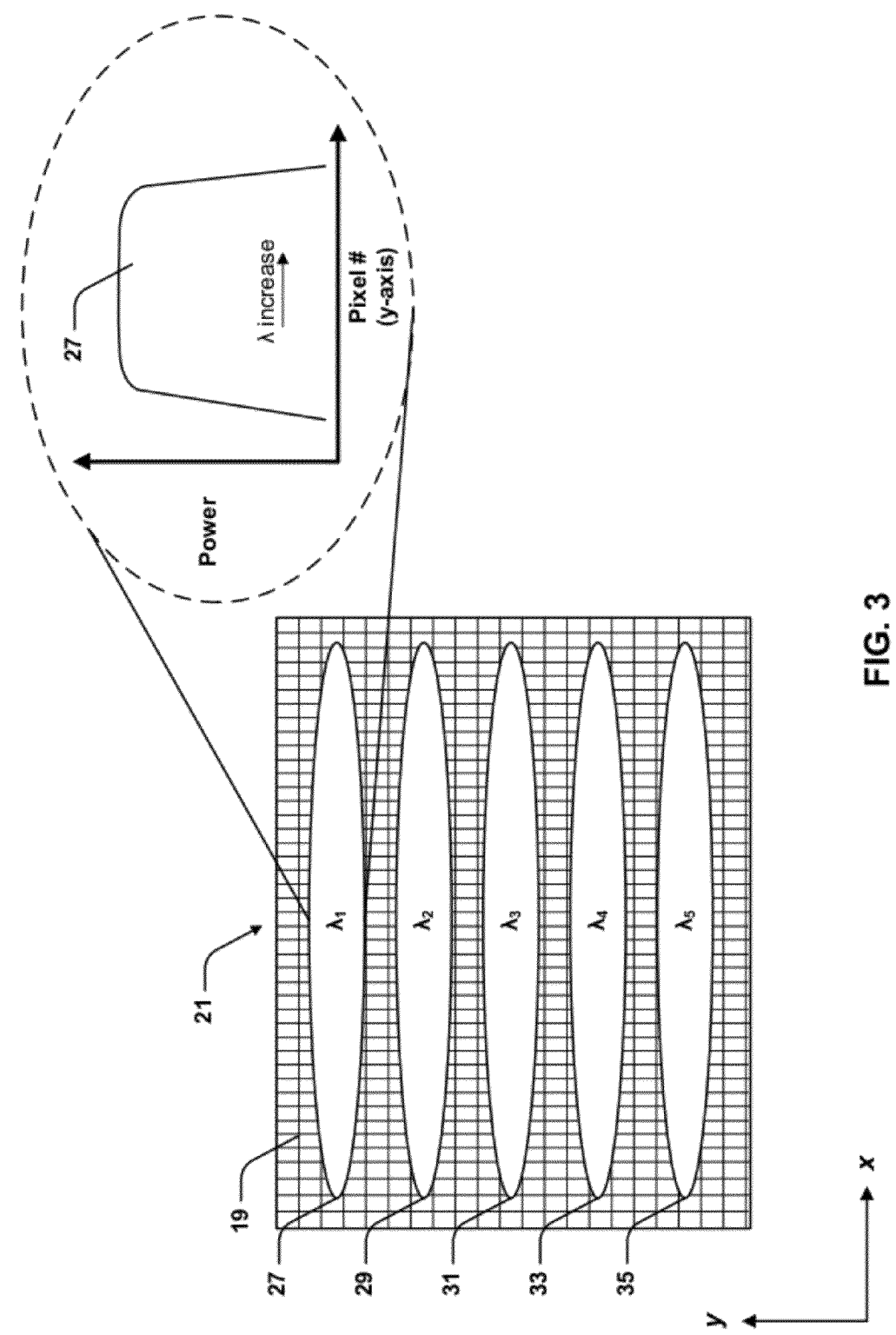
FIG. 3 is a schematic front view of an LCOS device showing five wavelength channels incident thereon, the inset shows a spectral cross-section plot of one of the wavelength channels.

Referring to FIG. 3 there is illustrated a front view of the LCOS device 21 configured to receive five wavelength channels 27, 29, 31, 33 and 35 spatially separated in a vertical dispersion dimension (y-axis). For clarity, a low pixel density is illustrated. In practice, the LCOS device 21 includes a large array of pixels 19, for example, 640×480 or 1400×1050 pixels. The channels are made highly elongate in a perpendicular switching dimension (x-axis) by various imaging optics and each channel is incident onto a number of pixels 19 in both the x and y axes. As will be discussed below, appropriate manipulation of the pixels 19 in the x-axis allows selective independent steering of each wavelength channel 27, 29, 31, 33 and 35. At the same time, manipulation of the pixels 19 in the y-axis allows for modification of particular spectral components, thereby providing the capability to selectively shape the channel spectrum. The inset of FIG. 3 illustrates the unmodified input power spectrum of channel 27.

Figure 4:
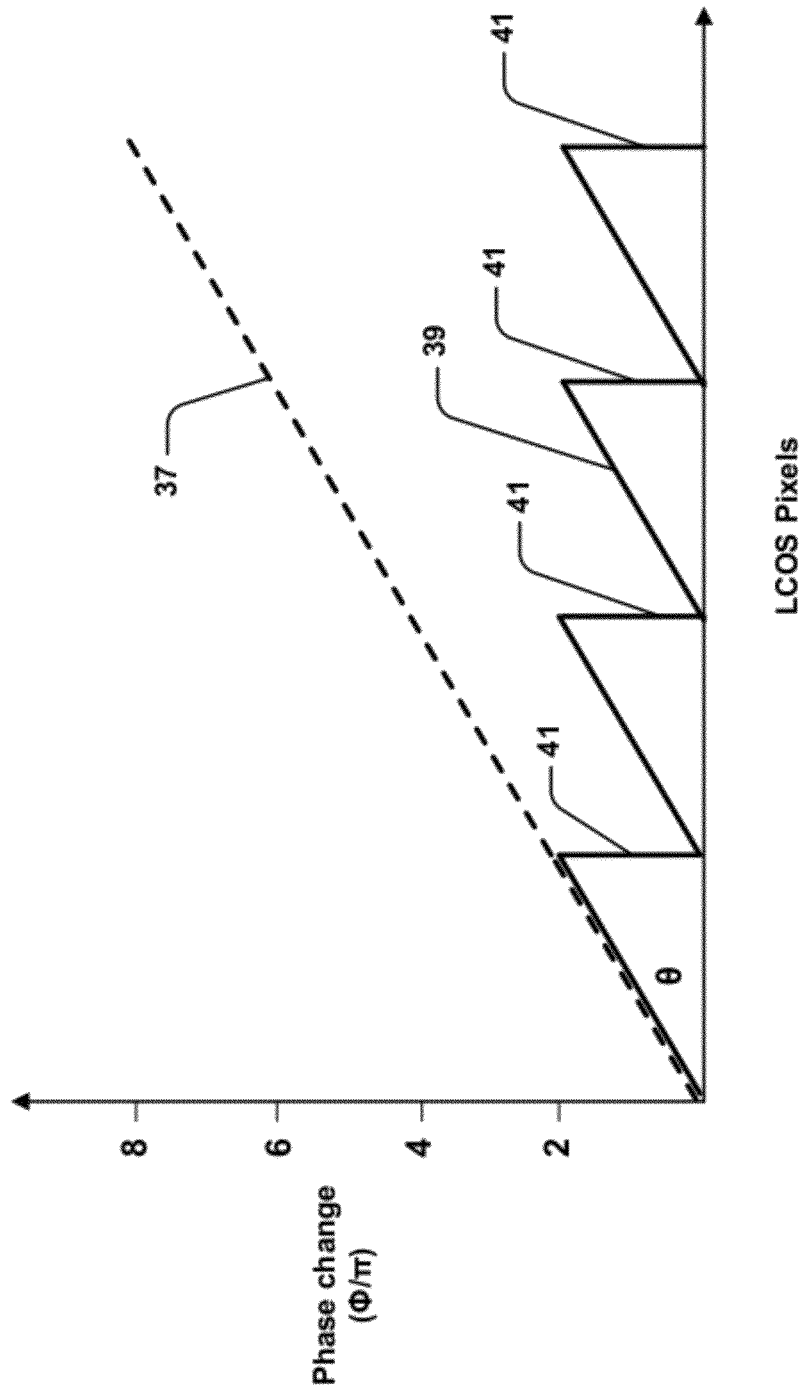
FIG. 4 is a plot of a steering function applied to selected LCOS pixels.

Turning to FIG. 4, there is illustrated an example steering phase profile 37 set up across a region of an LCOS device 21 in the x-axis. The steering profile 37 is produced by driving each pixel 19 with a predetermined voltage to provide a desired phase change. As there is a direct relationship between voltage and phase, and a direct relationship between phase and steering angle, a look-up table can be generated which relates the required voltage drive signal with a desired steering angle. Such a look-up table is able to be configured using software and is able to be reconfigurable. In other embodiments, a steering look-up table is hard-wired and is electronically preconfigured.

The periodic nature of phase is utilized to reduce the required drive voltage. Therefore a periodic voltage signal 39 illustrated in FIG. 4 will produce the cumulative phase profile 37, where phase resets 41 occur at multiples of $2\pi$ radians. When acting on an incident wavelength channel, the phase profile 37 produces a steering angle proportional to or equal to θ.

As mentioned, in addition to applying a steering phase function to steer an incident wavelength channel, the LCOS pixels 19 can be driven with other manipulating functions. These manipulating functions can be applied simultaneously and independently with the steering function to modify the output channel power spectrum. As the incident light has been spatially diffracted by diffraction grating 17, different spatial components correspond to different spectral components of light at the LCOS interface. These different spectral components are incident onto the LCOS device 21 along the y-axis. This is evident with reference to the inset of FIG. 3, which illustrates how the bandwidth of wavelength channel 27 extends across a range of pixels 19 of the LCOS device 21 in the y-axis. That is, each row of pixels in the x-axis represents a different spectral component of the wavelength channel. Therefore, the spectral shape of the wavelength channels can be manipulated by introducing relative local attenuation changes across a channel in the y-axis.

In the LCOS device 21, local attenuation changes can be implemented by driving selected pixels 19 with a sinusoidal signal or by varying the local angle θ of the phase steering function 37. This selectively couples light out of the first (or other) diffraction order thereby directing it away from configured output ports 13. The level of attenuation is defined by the intensity of the sinusoidal drive signal or the deviation in angle θ. This attenuation can be applied while maintaining a constant average phase along a column of pixels in the y-axis. In this manner, the selective attenuation is applied independent of the steering. It will be appreciated that similar attenuation means can be applied to other optical manipulation matrices such as MEMS arrays and piezoelectric arrays.

Before discussing how relative attenuation can be used to modify the output channel power spectrum, the effects of the WSS device 11 of FIG. 2 on an arbitrary wavelength channel are discussed. In particular, each WSS device 11 can be characterized as having an inherent spectral filter function that imposes spectral limitations on an incident wavelength channel. This overall filter function of the device 11 can be characterized as the convolution of an aperture function and an optical transfer function (OTF). The aperture function primarily defines the average bandwidth of the filter function and the OTF primarily defines the sharpness or roll-off characteristics of the filter function. In Pulikkaseril et al., it is found that the aperture function can be approximated by a rectangular function and the OTF can be approximated by a Gaussian type function. Both the aperture function and OTF are controlled by the states of the LCOS pixels 19.

Typically, the specific characteristics of a WSS filter function results in narrowing of the overall bandwidth of wavelength channels passed through the device. This narrowing effect is amplified each time a wavelength channel passes through a WSS in an optical network. Such bandwidth narrowing can give rise to a loss of channel information.

Figure 5:
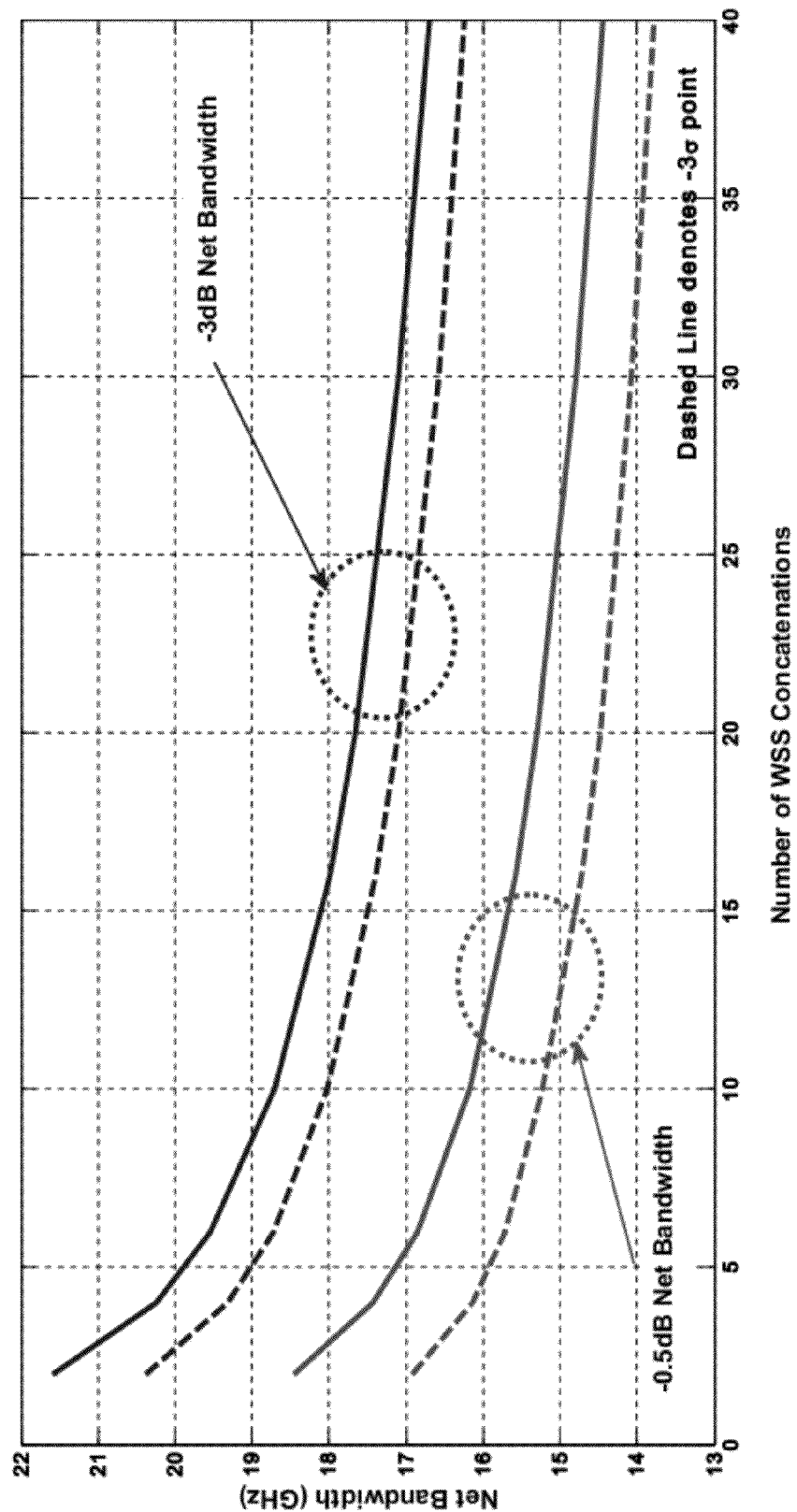
FIG. 5 is a plot of −3 dB and −0.5 dB channel bandwidth as a function of the number of concatenations through a WSS device.

To illustrate this bandwidth narrowing effect, reference is made to FIG. 5, which illustrates a plot of mean net bandwidth as a function of concatenations through a simulated WSS. Both the mean 3 dB and mean 0.5 dB bandwidths are plotted from a sample size of 100,000 measurements. Also plotted is the 3σ point (roughly 99.7% confidence interval) for both bandwidths. As clearly shown, the mean channel bandwidth decreases with more passes through the WSS. In a typical optical network, it is not uncommon for a wavelength channel to be routed through 10 to 20 WSS devices from transmitter to receiver. Based on the observations of FIG. 5, this concatenation could give rise to a channel bandwidth narrowing of about 10-20%, compared to its original transmitted bandwidth.

By implementing appropriate manipulation functions, it is possible to reduce the bandwidth narrowing effects mentioned above to thereby enhance the available channel bandwidth transmitted through an optical system or network. As mentioned above, this is possible by selectively modifying the optical attenuation applied across a wavelength channel, which essentially modifies the filter function of the WSS device.

Figure 6:
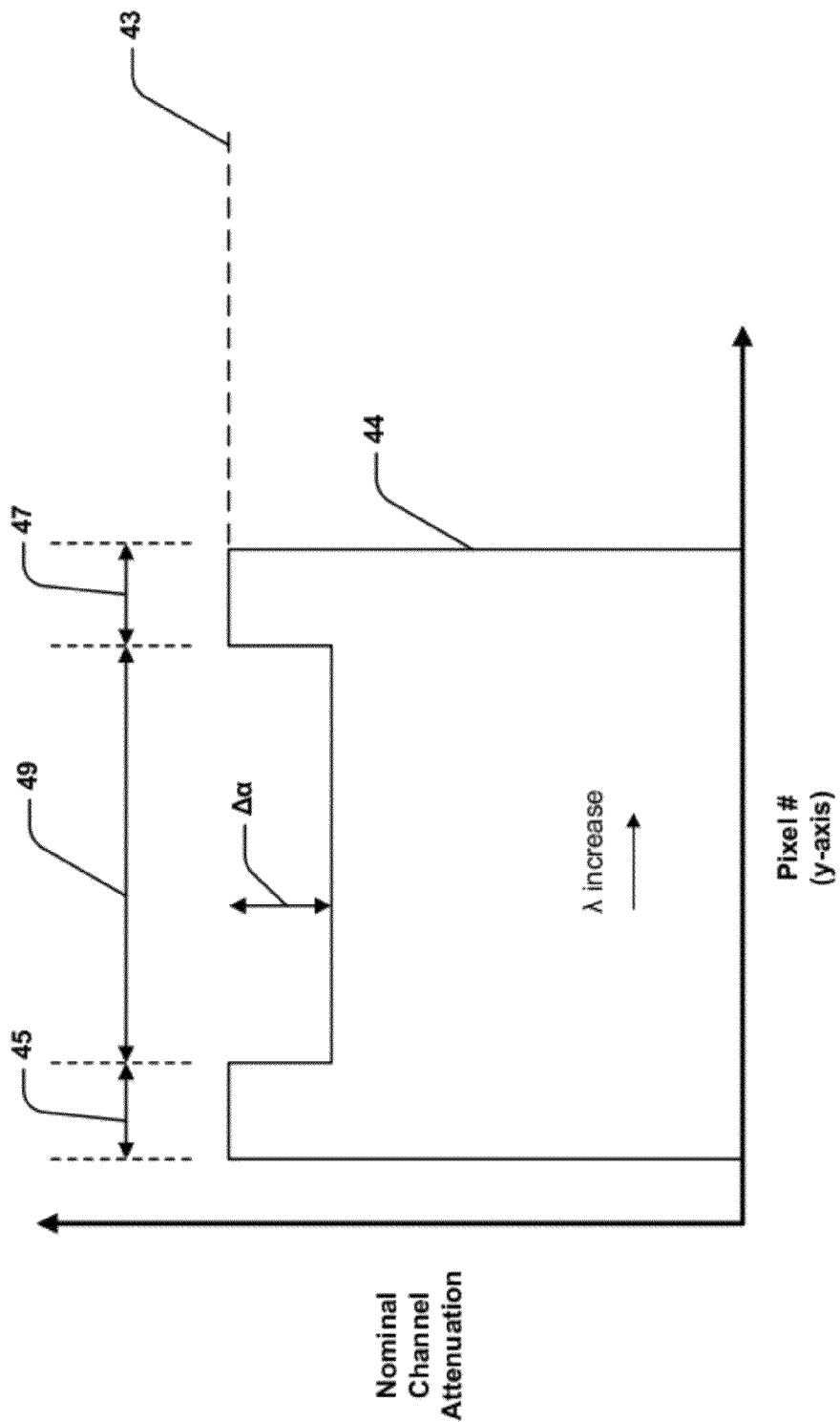
FIG. 6 is a plot of nominal channel attenuation as a function of pixel number across a wavelength channel on an LCOS device, showing two side regions of greater attenuation than a central region.

Referring now to FIG. 6, there is illustrated an example attenuation profile 44 set up in the y-axis across a region of an LCOS device corresponding to a single wavelength channel. Dashed line 43 indicates the channel power without applying selective attenuation by the LCOS device. Profile 44 defines two edge regions 45 and 47 surrounding a central region 49. In the illustrated configuration, edge regions 45 and 47 have not been attenuated by the LCOS device, while central region 49 has been selectively attenuated, relative to regions 45 and 47, by appropriate driving of the corresponding LCOS pixels.

The attenuation offset Δα can be defined based upon the available attenuation after the inherent optical loss of the WSS is taken into account. As an example, a WSS may have a permitted attenuation specification of about 7 dB and an optical loss of about 6 dB. Therefore, a maximum attenuation of about 1 dB is available for defining an offset Δα and manipulating the channel spectrum while remaining inside the device specification limits. A typical value for attenuation offset Δα is about 0.3 dB.

Figure 7:
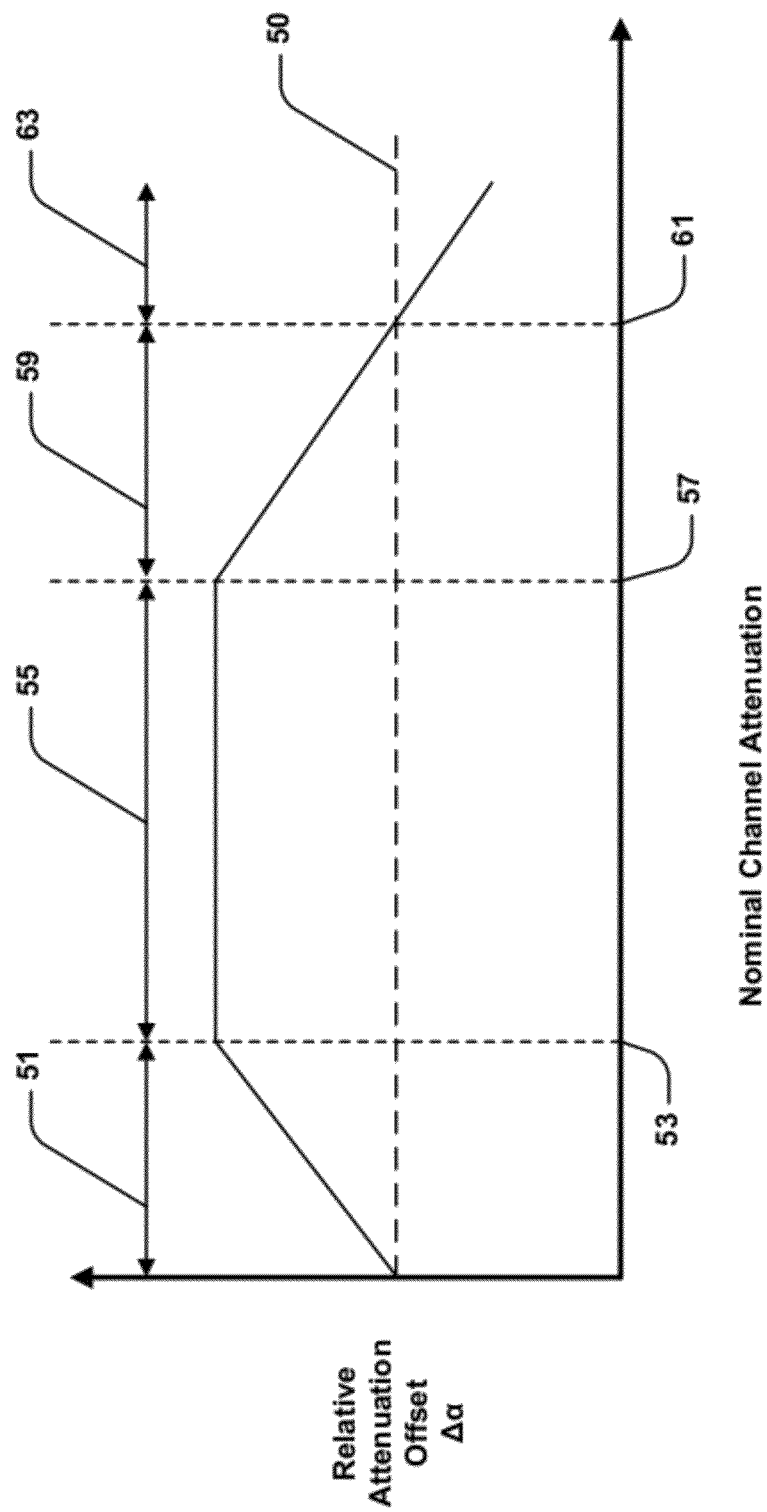
FIG. 7 is a plot of relative attenuation offset as a function of nominal channel attenuation.

In general, the offset between edge regions 45 and 47 and central region 49 is defined based on the inherent or nominal attenuation of the WSS device. Referring to FIG. 7, there is illustrated a plot of the attenuation offset Δα as a function of nominal attenuation of the WSS. Dashed line 50 indicates a relative offset Δα of 0, meaning that regions 45, 47 and 49 of FIG. 6 are equal. At low attenuation values, offset Δα is initially set equal to the available attenuation. This gives rise to the linear slope of region 51 with a slope of 1. When the attenuation reaches a first predetermined value 53, the offset Δα is capped at that value. This gives rise to a region 53 of constant offset. Too large an offset will result in the edge regions 45 and 47 of FIG. 6 becoming too large with respect to the central region 49. This can give rise to additional channel noise. At higher attenuation levels, beyond a second predetermined value 57, the offset Δα is linearly decreased with increased nominal attenuation, defining region 59. The reason for the reduction in offset Δα is that, at large channel attenuations, too much additional attenuation from offsetting will significantly reduce the signal-to-noise ratio of the channel.

Figure 8:
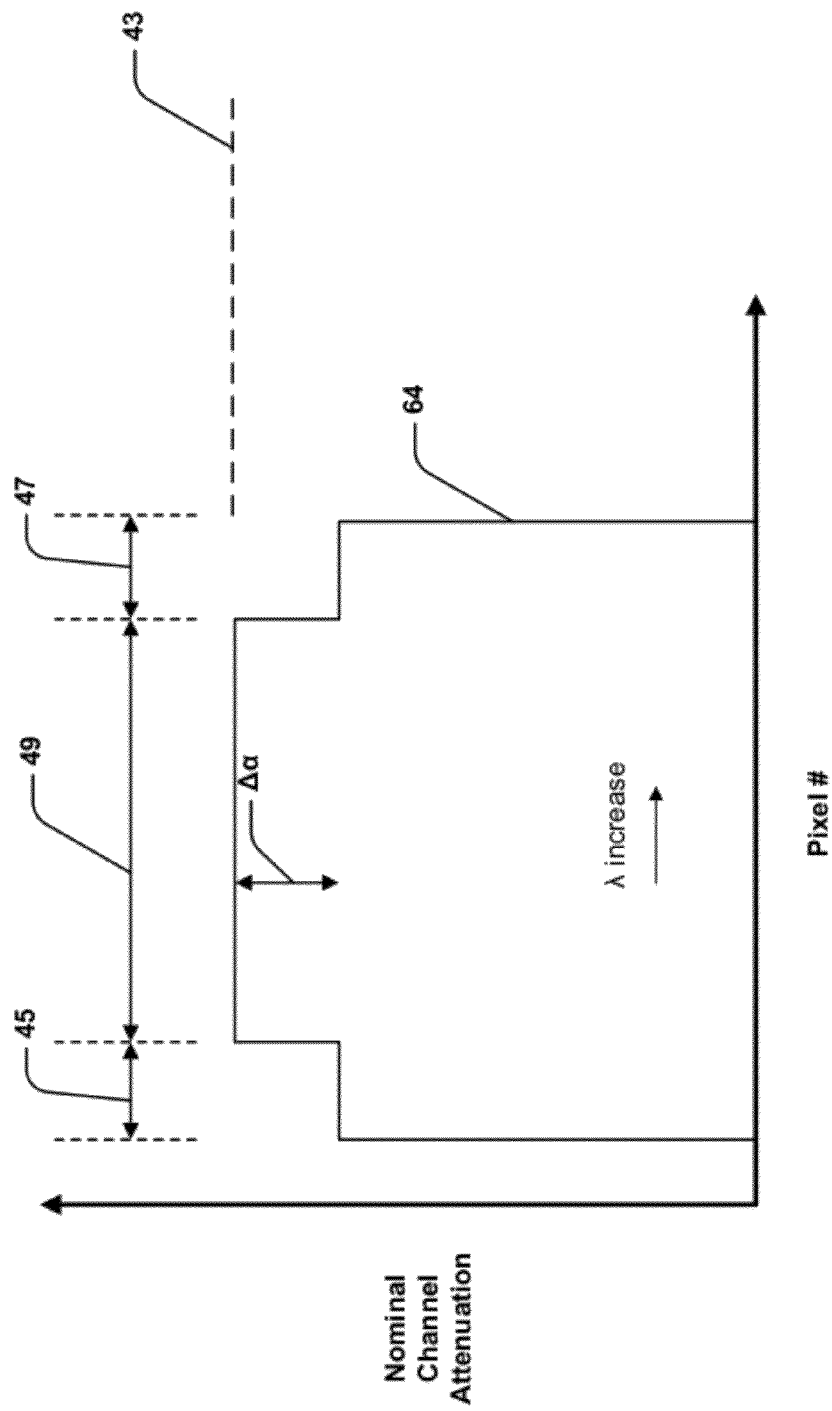
FIG. 8 is a plot of nominal channel attenuation as a function of pixel number across a wavelength channel on an LCOS device, showing two side regions of less attenuation than a central region.
Figure 9:
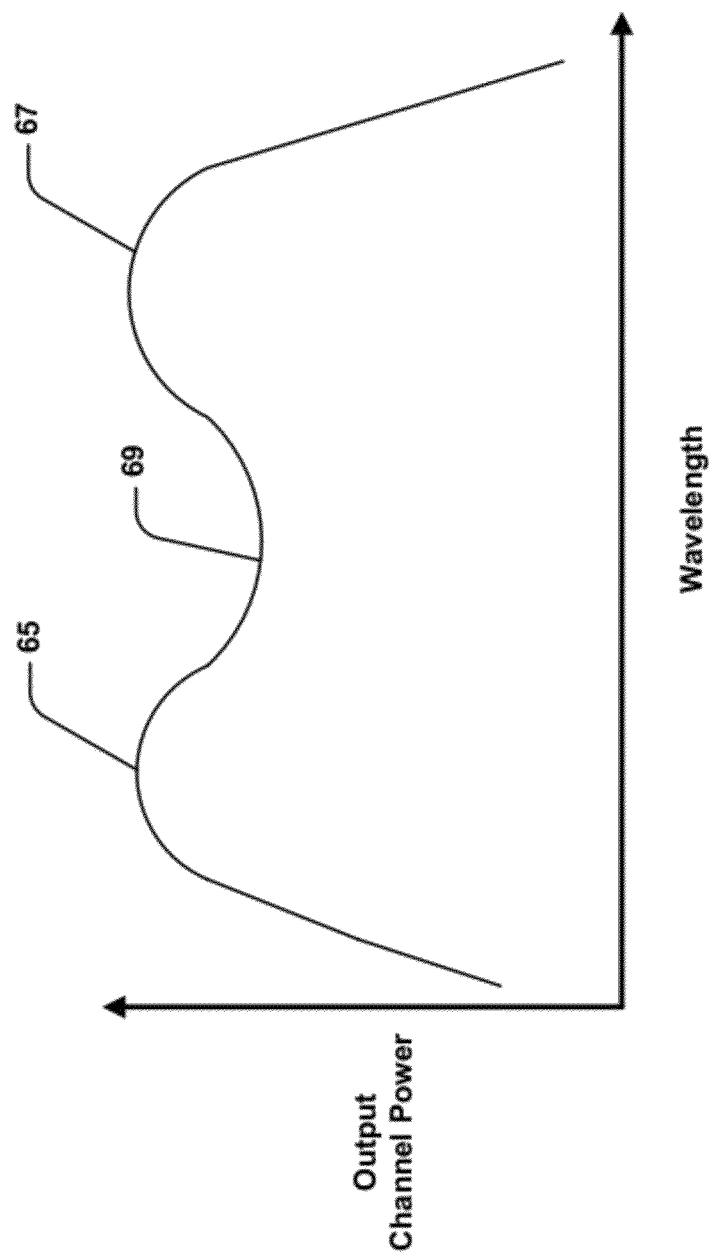
FIG. 9 is a plot of output channel power as a function of LCOS pixel number.

Beyond a third predetermined attenuation value 61, the offset Δα is negative, meaning that the edge regions 45 and 47 of FIG. 6 are attenuated greater than the central region 49. This defines region 63. Referring now to FIG. 8, there is illustrated an example attenuation curve 64 having a negative offset Δα. Again, dashed line 43 indicates the channel power without applying selective attenuation by the LCOS device. In FIG. 8, no attenuation is applied to the central region 49 and side regions 45 and 47 are selectively attenuated by the LCOS pixels 19. Such a situation is established to reduce the instance of so-called "rabbit-ears" filter profiles. Such a filter profile is illustrated in FIG. 9. This profile includes two side peaks 65 and 67 adjacent a central trough 69. Rabbit-ears filter profiles are prevalent at high attenuation levels and are generally detrimental to channel performance.

Figure 10:
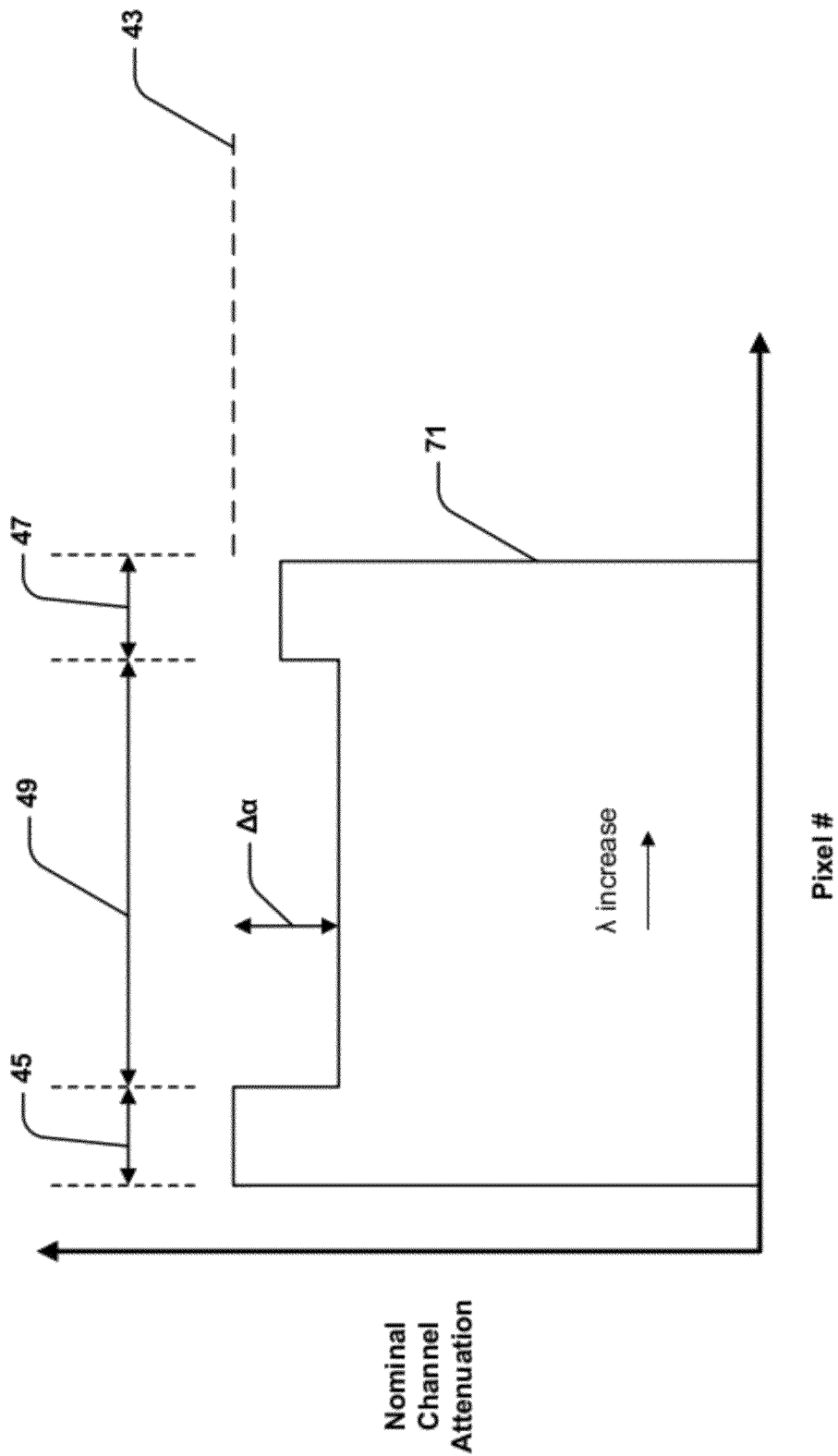
FIG. 10 is a plot of nominal channel attenuation as a function of pixel number across a wavelength channel on an LCOS device, showing two side regions of unequal but greater attenuation than a central region.

Referring again to FIGS. 6 and 8, edge regions 45 and 47 are shown with equal attenuation offset Δα relative to central region 49. This need not be the case. In some instances it is advantageous to apply different relative offsets Δα to each edge region 45, 47. For example, FIG. 10 illustrates an attenuation profile 71 wherein edge region 45 has a greater relative attenuation than edge region 47. For example, attenuation profile 71 could be applied when neighboring channels are directed to different WSS output ports or are attenuated by different amounts.

Figure 11:
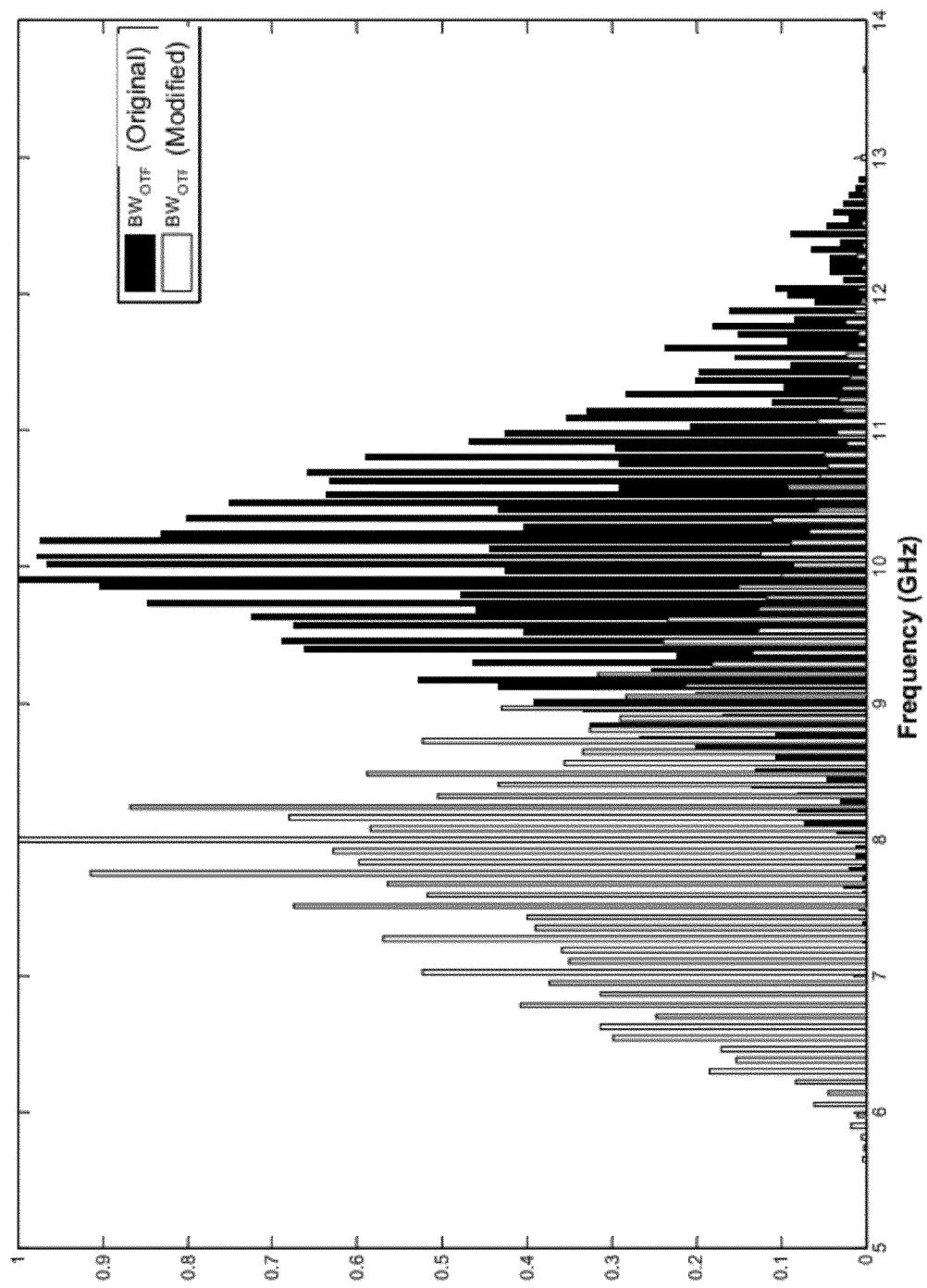
FIG. 11 is a statistical plot of the effective OTF bandwidth of a WSS before and after selective attenuation has been applied.

The application of an optical attenuation profile to a wavelength channel, as described above, modifies the effective filter function of the WSS. In particular, the effective OTF bandwidth is decreased. As the OTF characterizes the steepness or roll-off of the WSS filter function, this decrease in OTF bandwidth effectively sharpens the overall filter function of the WSS. Referring to FIG. 11, there is illustrated statistical plots of the effective OTF bandwidth of a WSS before and after selective attenuation has been applied. The filled bars represent the original OTF bandwidth while the open bars represent the OTF bandwidth after selective attenuation of the channel spectrum has been applied. Comparing the two distributions of measurements, there is a clear decrease in the mean effective OTF bandwidth of about 2 GHz after applying selective attenuation.

With selective attenuation, while the OTF bandwidth is reduced, the aperture function bandwidth, which primarily characterizes the number of pixel columns allocated to each channel, remains relatively constant. This gives rise to an increase in the effective bandwidth of an output optical channel without increasing the columns of pixels required to couple the channel. This can be seen with reference to FIG. 12, which conceptually illustrates the spectrum 73 of a wavelength channel before selective attenuation modification has been applied, and the resulting spectrum 75 after selective attenuation has been applied. The bandwidth 77 measured at low optical power, such as −20 dB, remains essentially constant, while the bandwidth 79 at higher optical power, such as −0.5 dB, has significantly increased. Therefore, the useful higher power channel bandwidth has increased without increasing the overall channel bandwidth, which would otherwise increase cross-talk between adjacent channels.

Figure 12:
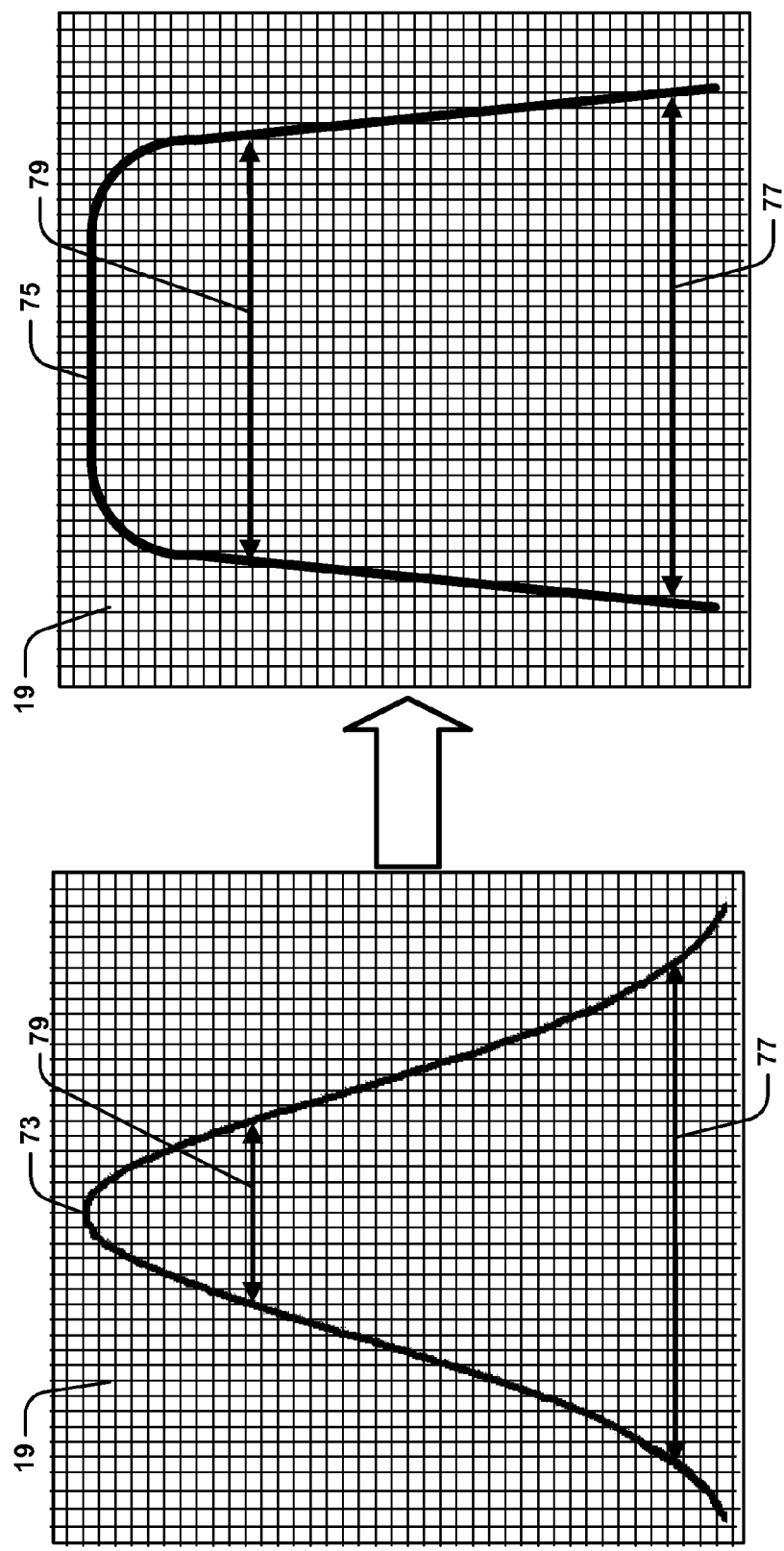
FIG. 12 conceptual diagram illustrating spectral plots of a wavelength channel before and after selective attenuation has been applied.
Figure 13:
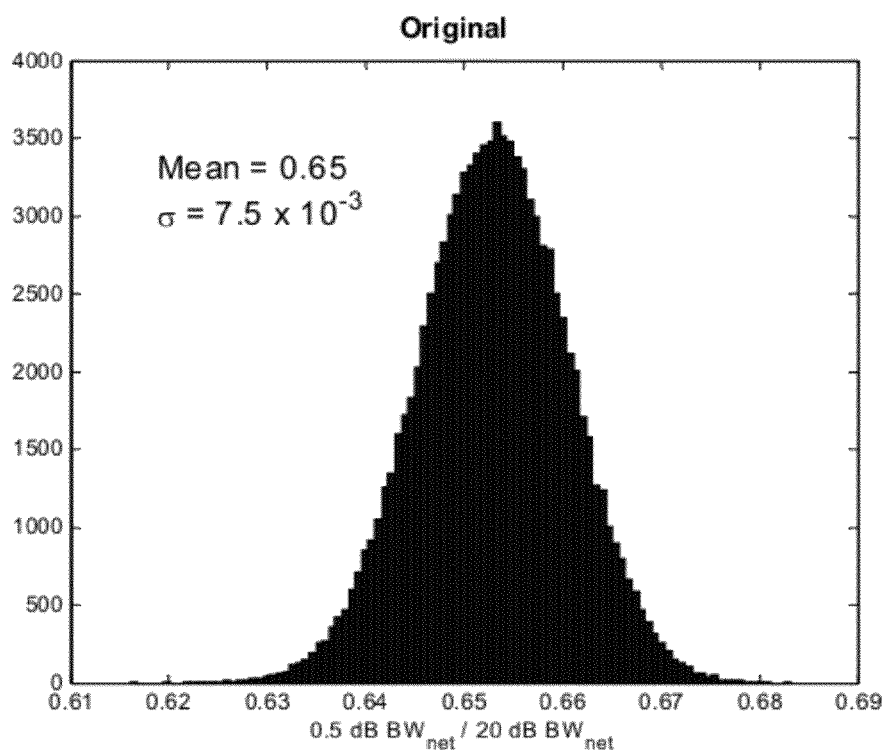
FIG. 13 is a statistical plot of the mean ratio of −0.5 dB bandwidth to the −20 dB bandwidth of the OTF without selective attenuation.
Figure 14:
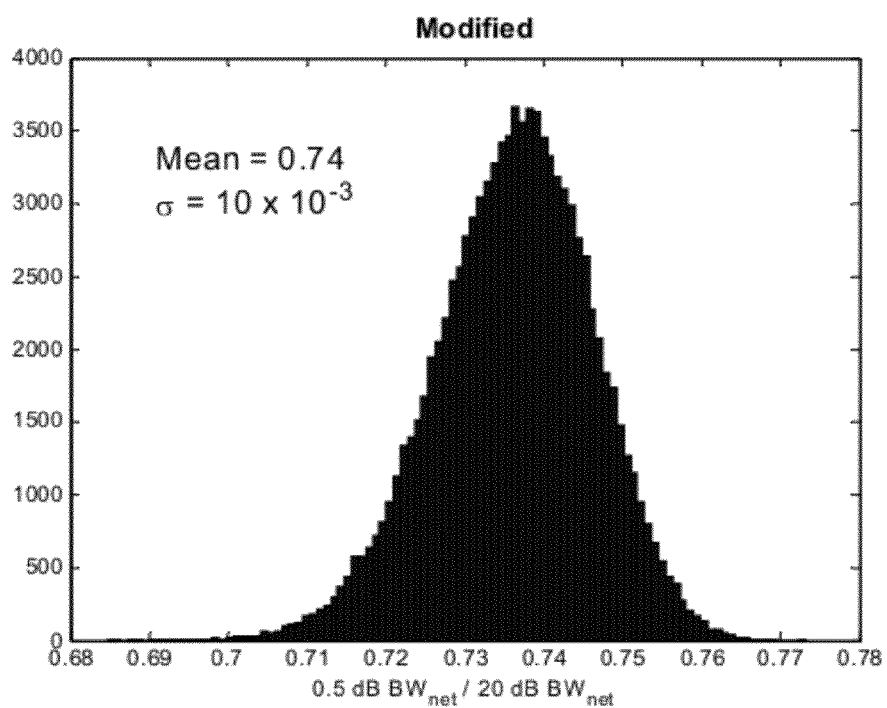
FIG. 14 is a statistical plot of the mean ratio of −0.5 dB bandwidth to the −20 dB bandwidth of the OTF, this time after selective attenuation has been applied.

Comparison of the −0.5 dB bandwidth with the −20 dB bandwidth is a good measure of the sharpness of the filter function of a WSS. Referring now to FIG. 13 there is illustrated a statistical plot of the mean ratio of −0.5 dB bandwidth to the −20 dB bandwidth of the OTF of a WSS without selective attenuation. This plot shows a mean ratio of about 0.65. Now, referring to FIG. 14, there is illustrated another statistical plot of the mean ratio of −0.5 dB bandwidth to the −20 dB bandwidth of the OTF, this time after selective attenuation has been applied. This plot has a mean ratio of about 0.74. A ratio closer to 1 indicates that the modified OTF of FIG. 14 has a sharper roll-off than that of FIG. 13. This result agrees with FIG. 12.

Referring again to FIG. 12, this alteration of the OTF shape more efficiently distributes the channel power across a predefined region of LCOS pixels configured to steer a particular wavelength channel. This more efficient use of available pixel space translates, in effect, to an enhanced channel bandwidth. While the overall channel bandwidth is not increased, the bandwidth at higher power levels is enhanced. This is typically more useful bandwidth and therefore, this enhancement is referred to as an enhanced "effective" bandwidth. Therefore, by applying a predetermined non-uniform attenuation profile to a wavelength channel, the effective bandwidth of the channel is enhanced without the need for increasing the number of pixels allocated to the channel. This is particularly advantageous in optical systems where the channel plan is preset and adjacent channels are closely spaced.

Figure 15:
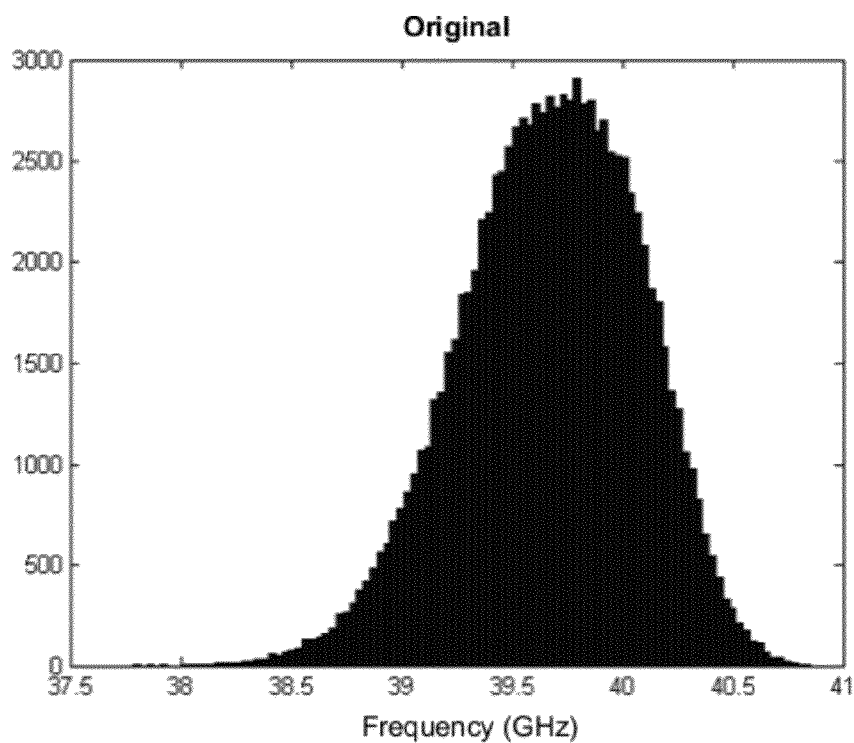
FIG. 15 is a statistical plot of the −3 dB bandwidth of an optical channel received after two concatenations through a WSS device, without selective attenuation of the channel spectrum.
Figure 16:
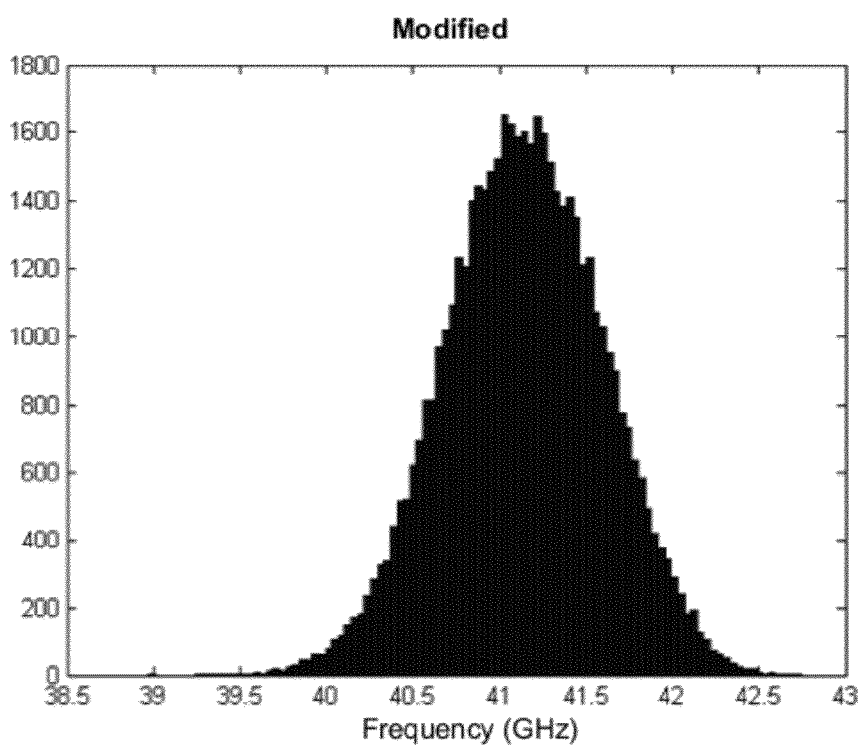
FIG. 16 is a statistical plot of the −3 dB bandwidth of an optical channel received after two concatenations through a WSS device, after selective attenuation of the channel spectrum has been applied.

The enhancement of output channel bandwidth is most advantageous when the channel is transmitted through a number of concatenated WSS devices. Turning now to FIGS. 15 and 16, there are illustrated statistical plots of the −3 dB bandwidth of an optical channel received after two concatenations through a WSS device. FIG. 15 shows the output without selective attenuation of the channel spectrum while FIG. 16 shows the output after selective attenuation has been applied. The plot of FIG. 15 illustrates a mean bandwidth of about 39.6 GHz. FIG. 16 illustrates a mean bandwidth of about 41.1 GHz, an increase in bandwidth of about 1.5 GHz due to selective attenuation of the channel spectrum.

Figure 17:
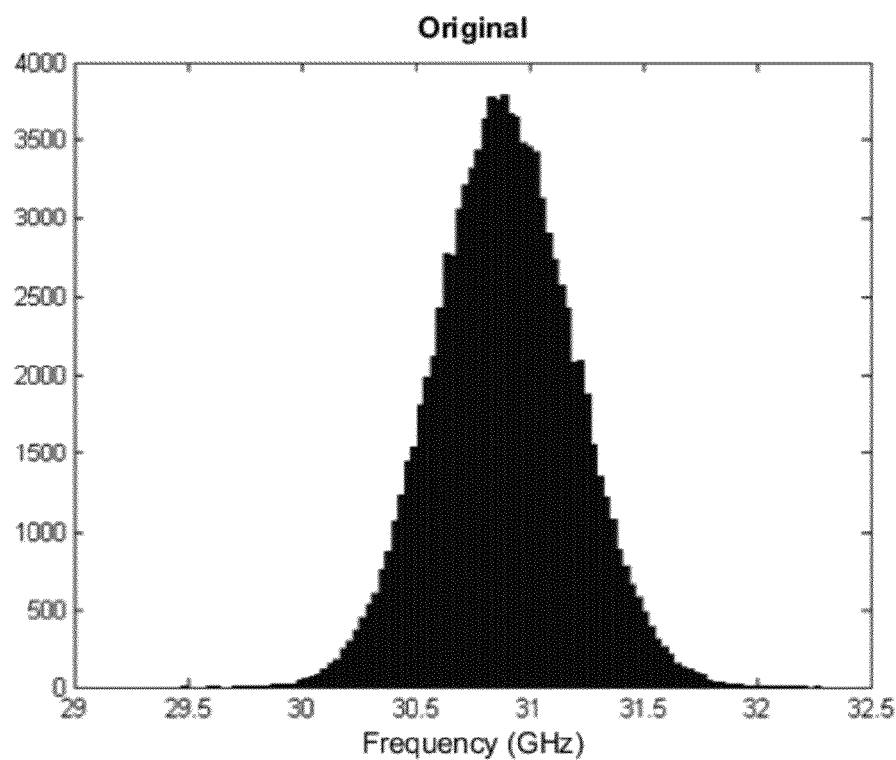
FIG. 17 is a statistical plot of the −3 dB bandwidth of an optical channel received after twenty concatenations through a WSS device, without selective attenuation of the channel spectrum.
Figure 18:
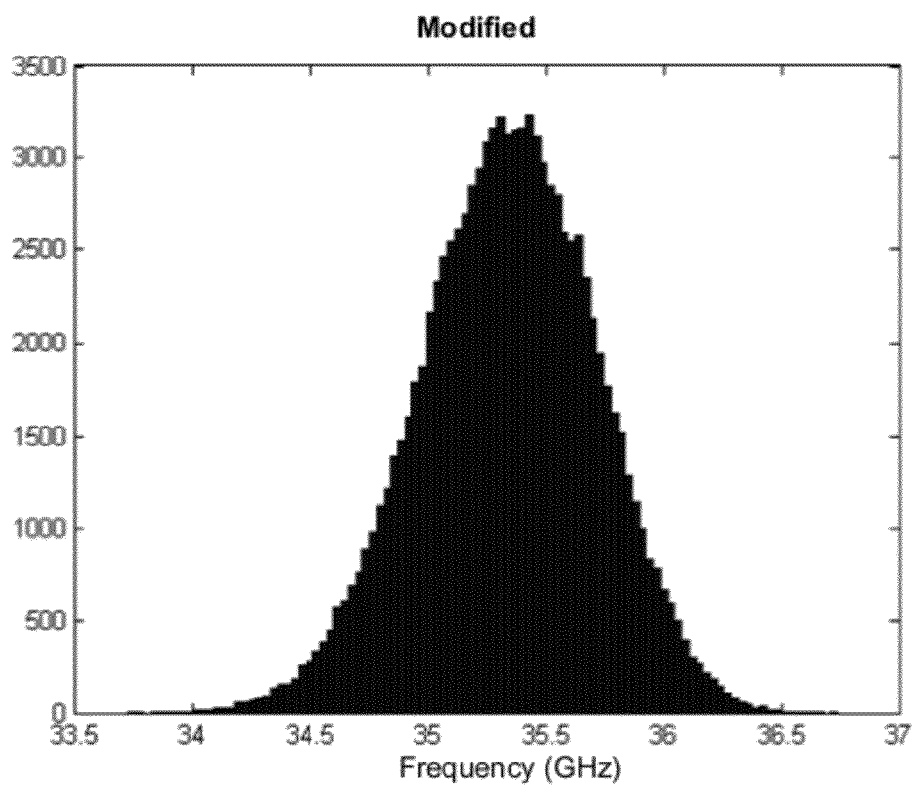
FIG. 18 is a statistical plot of the −3 dB bandwidth of an optical channel received after twenty concatenations through a WSS device, after selective attenuation has been applied.

Turning now to FIGS. 17 and 18, there are illustrated statistical plots of the −3 dB bandwidth of an optical channel received after twenty concatenations through a WSS device. FIG. 17 shows the output without selective attenuation of the channel spectrum while FIG. 18 shows the output after selective attenuation has been applied. The plot of FIG. 17 illustrates a mean bandwidth of about 30.8 GHz and FIG. 18 illustrates a mean bandwidth of about 35.4 GHz. Therefore, a bandwidth increase of about 4.6 GHz is observed due to selective attenuation of the channel spectrum. Comparing the bandwidth increase observed between FIGS. 15 and 16 and between FIGS. 17 and 18, it is seen that the advantageous effects of selective attenuation become more apparent after more concatenations through WSS devices. This trend makes the presently disclosed selective attenuation process particularly important when transmitting wavelength channels through multi-node optical networks.

The above described attenuation modification procedure can be embedded into software that drives the LCOS or other optical manipulation matrix device. As such, this capability can be retro-fitted into existing WSS devices to enhance the spectral performance of these devices. The disclosed method is able to be applied to LCOS or other matrix based optical manipulation elements independently of the particular channel plan that is present. As, in some embodiments, the method is implemented in the device software, it is able to be varied in accordance with changes in channel plans to the optical system.

In addition to the above-described attenuation modification functions, the LCOS pixels can also be driven with other channel shaping phase functions to provide gain and/or non-linearity equalization. For example, FIG. 19 illustrates a ramp attenuation function applied to a wavelength channel for providing gain and nonlinearity equalization. These additional shaping functions can be superimposed with the bandwidth maximizing function and steering function such that the LCOS device performs all of these functions simultaneously.

Furthermore, selective attenuation of the channel spectrum can be implemented in conjunction with the partial channel pixel allocation technique mentioned above. However, the OTF will vary depending on the amount and position that a pixel column is allocated to a wavelength channel. Therefore, amount of enhancement in effective bandwidth may depend upon the particular partial column allocation implemented.

Conclusions

The above disclosure provides an improved system and method for enhancing effective channel bandwidth and thereby reducing channel bandwidth narrowing in optical systems. The method is particularly advantageous for use in multi-node systems having a number of concatenated WSS devices, where the overall concatenated channel bandwidth is enhanced.

A non-uniform attenuation profile is applied to a wavelength channel to modify the OTF and hence the filter profile of a WSS. As illustrated in FIGS. 6, 8 and 10, the non-uniform attenuation profile includes an attenuation offset between the edges and centre of a wavelength channel spectrum. The alteration of the OTF shape more efficiently distributes the channel power across a predefined region of LCOS pixels configured to steer a particular wavelength channel, as shown in FIG. 12. In effect, this enhances the output channel bandwidth without the need for increasing the number of pixels allocated to the channel. This is particularly advantageous in optical systems where the channel plan is preset and adjacent channels are closely spaced.

Advantages of the present disclosure include:
Wider effective operating bandwidth for high data rates that require high forward error correction (FEC) overhead;
Higher nodal system capacity;
The enhanced WSS filter bandwidth will provide system manufacturers with the ability to push 100 Gb/s data to travel further distances, while travelling through more ROADM nodes with a higher FEC rate (up to 20%);

The net gain in WSS filter bandwidth allows system architects to pass channels through a larger number of ROADM nodes, while using a higher FEC rate (up to 20%) without seeing performance drop off.

Interpretation

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A method of enhancing the network bandwidth transmission of a wavelength selective switch of the type having a controllable wavelength dependant attenuation modification of wavelength channels, the method including the steps of:
   (a) receiving one or more wavelength channels having a bandwidth distributed spatially along a wavelength axis;
   (b) modifying the optical attenuation characteristics of the one or more wavelength channels relative to the wavelength axis to provide for enhanced bandwidth transmission, wherein said modifying step includes applying a relative attenuation offset between at least one side spectral region and a central spectral region of the one or more wavelength channels.

2. A method as claimed in claim 1 wherein the amount of attenuation along the wavelength axis of any particular wavelength channel is maintained to within a predetermined permitted attenuation specification.

3. A method as claimed in claim 1 wherein the amount of attenuation at any wavelength is non-linear with respect to the overall attenuation of the wavelength selective switch at any wavelength.

4. A method as claimed in claim 1 wherein the amount of attenuation with respect to wavelength is further modelled in a non linear manner, including:
   for low levels of actual wavelength attenuation relative to a permitted amount of attenuation, a monotonic increasing level of attenuation up to a predetermined limit;
   for high levels of actual wavelength attenuation relative to a permitted amount of attenuation, a monotonically decreasing level of attenuation.

5. A method as claimed in claim 4 wherein, for levels of attenuation exceeding said permitted amount of attenuation, end regions of a channel are attenuated more than a central region of a channel.

6. A method as claimed in claim 1 further comprising modifying the degree of attenuation to take into account of other gain and/or non-linear equalizations.

7. A method of enhancing channel bandwidth in an optical system, said method including the steps of:
   a) transmitting at least one optical signal including at least one individual wavelength channel;

b) passing said at least one optical signal through at least one wavelength switching device by:

(i) spatially dispersing said individual wavelength channels of said at least one optical signal;

(ii) projecting said spatially dispersed wavelength channels onto corresponding predetermined regions of an optical manipulation matrix including a plurality of individually addressable manipulating elements;

(iii) determining a modification function that specifies a state for each said manipulating element within said predetermined region; and (iv) driving said elements of said corresponding regions at states specified by said function to selectively modify said channel band shape such that the received channel's bandwidth is substantially enhanced, and to spatially direct said wavelength channels to predetermined output ports of said wavelength switching device; and c) receiving said wavelength channels.

8. A method according to claim 7 wherein the step of determining said modification function includes determining a non-uniform attenuation profile to selectively attenuate said wavelength channel as a function of wavelength.

9. A method according to claim 8 wherein said attenuation profile includes a relative attenuation offset between at least one edge spectral region and a central spectral region of said wavelength channel.

10. A method according to claim 9 wherein the relative attenuation offset is specified relative to a predetermined attenuation value corresponding to the wavelength switching device.

11. A method according to claim 10 wherein:

for a first range of said predetermined attenuation values, said relative attenuation offset is set equal to said predetermined attenuation value;

for a second range of said predetermined attenuation values, said relative attenuation offset is set to a constant capped value; and for a third range of said predetermined attenuation values, said relative attenuation offset is set to decrease linearly with an increase in said predetermined attenuation value.

12. A method according to claim 7 wherein said modification function reduces the bandwidth of an optical transfer function characteristic of the wavelength switching device.

13. A method according to claim 7 wherein the ratio of the −0.5 dB to −20 dB bandwidth of the received wavelength channel is enhanced.

* * * * *